United States Patent [19]

Imhoff et al.

[11] 4,361,973
[45] Dec. 7, 1982

[54] BULK MATERIAL CONVEYING FOR A PNEUMATIC DREDGER

[75] Inventors: Lothar Imhoff, Kerpen-Buir; Walter Hoppe, Duren; Wilhelm Bay, Kerpen-Buir, all of Fed. Rep. of Germany

[73] Assignee: Zimmermann & Jansen Gesellschaft mit Beschrankter Haftung, Duren, Fed. Rep. of Germany

[21] Appl. No.: 181,084

[22] Filed: Aug. 22, 1980

[30] Foreign Application Priority Data

Aug. 23, 1979 [DE] Fed. Rep. of Germany ....... 2934119

[51] Int. Cl.³ .............................................. E02F 3/88
[52] U.S. Cl. ......................................... 37/58; 37/72; 406/191
[58] Field of Search ....................... 37/58, 72; 406/191

[56] References Cited

U.S. PATENT DOCUMENTS 4,094,548 6/1978 Schnell .............................. 37/58 X

*Primary Examiner*—Clifford D. Crowder
*Attorney, Agent, or Firm*—Karl F. Ross

[57] ABSTRACT

A pneumatic dredger bulk conveyor of the type wherein a conveyor line is formed by a first circular outer tube and a first inner tube telescopically slidable therein and a pressure line is formed by a second outer tube fixed to the first outer tube and a second inner tube telescopically slidable in the second outer tube in coordinated movement with the first inner tube, the improvement which comprises an upper circular guide member formed at the upper end of the first inner tube and closely spaced from the first outer tube defining a first circular interspace therewith, the first inner tube having below the upper guide member a polygonal profile forming a second interspace with the first outer tube having a greater cross sectional area than the first interspace and constituted by a plurality of first segmented passages of greater width than the first interspace and each of which is bounded by an arc of the first outer tube and a plane of the polygonal profile.

7 Claims, 5 Drawing Figures

BULK MATERIAL CONVEYING FOR A PNEUMATIC DREDGER

FIELD OF THE INVENTION

The present invention relates to the conveying of bulk material disposed on the bed of a body of water, wherein the bulk material is sucked up and is transported as a bulk material/water mixture under pressure through a conveying line to above water level, and there, for example on the pontoon of a dredger, separated from the water and collected.

BACKGROUND OF THE INVENTION

Bulk material conveying apparatus for pneumatic dredgers are known in which a conveying line carries at its lower end a suction head or conveyor head, the conveying line comprising two telescopically slidable tube sections and a compressed air line coordinated to the conveying line and connected to either a suction head or conveyor head, thereof. Herein the upper tube section of the conveyor line is provided at its lower end and the lower tube section of the same is provided at its upper end with guide members, which coact with the corresponding other tube section and which in each case form an interspace along the overlapping parts of the tube sections. It is also known that the compressed air line comprises a rigid tube section over a length adapted to the length of the lower telescoping tube section of the conveying line, which is connected to the suction or conveyor head, respectively, and which is liftable and lowerable with the lower telescoping tube section of the conveying line.

Bulk material conveying apparatus of this kind are already state of the art, and are shown for example by the Frech Patent disclosure No. 21 26 920 and the German Auslegeschrift No. 23 55 831 (see U.S. Pat. No. 4,094,548).

It is necessary in such bulk material conveying apparatus to lift and to lower the suction head or conveyor head, respectively depending on the varying water depths encountered during the conveying process in order to maintain the bulk material suction or conveyor head at ground level along the water bed.

In order to achieve adjustability of the suction or conveyor head, the conveying lines comprises two one slidable in the other, tube sections, the relative slidability of which is such so as to balance the expected level differences at the water bed.

Difficulties have resulted in the practical operation of such bulk material conveyors in practical applications, since from the bulk material/water mixture transported, sand and gravel can pass into the interspace between the two telescoping tube sections. The result is that the relative movability of the telescoping tube sections can be blocked or at least interfered with and understandably this also results in higher wear.

In order to avoid these difficulties according to French patent disclosure No. 21 26 920, there is provided at the outer tube section an annular chamber sealed with sealing lips relative to the inner tube section which is fed with compressed air. Based on this embodiment it is possible to achieve in fact on the lower end of the outer tube section a seal against the inner tube section, since the interspace is closed off at its bottom. At the upper side of the inner tube section however no such sealing is provided with the result that from the top, bulk material can pass into the interspace when upon switching off of the conveyor pump the conveying process is interrupted. The bulk material already in the conveying line sinks against the conveying direction, downwardly, and a part of the same can pass into the open annular slot between the inner and outer tube sections.

According to German Auslegeschrift No. 23 55 831, to avoid this disadvantage, it is provided that the interspace between the two mutually overlapping telescoping tube sections forms the space to be filled with the pressure medium, and that of the sealing collars limiting this space, one of the sealing collars is at the end of one tube section and the other of the sealing collars is at the other end of the tube section.

The full length of the interspace formed by the mutually overlapping regions of the telescoping tube sections is well protected against the intrusion of bulk material in this embodiment. However, the annular sealing collars are formed from elastic material, one of which is located at the lower end of the upper outer telescoping tube section and which collar acts against the outer circumference of the lower inner telescoping tube section, and the other of which is attached to the upper end of the inner telescoping tube section and which collar acts with a sealing lip against the inner circumference of the upper outer telescoping tube section, the lifetime of the collars being very limited in view of the rough operating conditions. Especially endangered is the durability of the sharp sealing lip of the sealing collar disposed at the upper end of the inner tube section, since it is subjected to the immediate effect of the transported bulk material. Therefor, it cannot be avoided, that sand and fine grained gravel deposit between the wall of the conveyor tube and the sealing lip and generate upon lifting and lowering of the lower telescoping section, grooves and channels at the seals. These then endanger not only the sealing of the interspace filled with compressed air, but can even lead to the situation that in the course of time, bulk material passes into the interspace and slowly fills and closes and the interspace off.

OBJECTS OF THE INVENTION

It is an object of the present invention to provide an improved bulk material conveyor which will obviate all of the above recited disadvantages and deficiencies of the known bulk material conveying apparatus. Therefor, it is another object of the invention to provide a bulk material conveyor for pneumatic dredgers with a conveying line comprising two telescopically slidable tube sections not requiring a sealing of the interspace between the two overlapping regions of the tube sections and nevertheless avoiding jamming of the telescoping tube sections inside each other by the entering of bulk material.

SUMMARY OF THE INVENTION

In the present invention, it is intentionally accepted that bulk material up to a certain grain size can slide from above into the interspace by the overlapping regions of the telescoping tube sections and upper and lower guide members formed respectively on the inner and outer tube sections. The interspace is constructed regarding form and dimensions so that the entered bulk material can pass through it from top to bottom practically without hindrance or jamming, the upper guide member forming a narrow circular interspace with the outer tube section and the lower guide member being segmental and forming a larger interspace with the inner tube section and acting to maintain the tube sections in a fixed axial relationship.

It has proven to be particularly advantageous to construct the bulk material conveying apparatus according to specific features of the invention in which the cylindrical inner tube section is surrounded by a polygonol jacket against which the segments of the lower guide member ride, the segments being planar and surrounded by a cylindrical shell and spaced from one another to provide a path for the settling bulk material while coacting with detents on the polygonal jacket to limit the downward extension of the inner tube section.

For the orderly operation of a bulk material conveying apparatus the continuous and free operation of the pressure line is indispensible. It has to be assured in fact, that damages and leaks to the compressed air line are avoided during the lifting and lowering motions of the lower telescoping tube section of the conveying line during the site changing process, which are required for the change in level of the suction head or conveyor head, respectively, in order to prevent collapse of the conveying column.

This is achieved by employing an inflatable hose seal between the inner and outer tubes of the pressure line, the seal acting as a brake between the tubes when inflated, and being formed with resilient ribs which act to maintain an airtight seal between the tubes when the hose seal is deflated.

BRIEF DESCRIPTION OF THE DRAWING

The above and other objects, features and advantages of the invention will become more readily apparent from the following description, reference being made to the accompanying drawing, in which.

SPECIFIC DESCRIPTION

Figure 1:
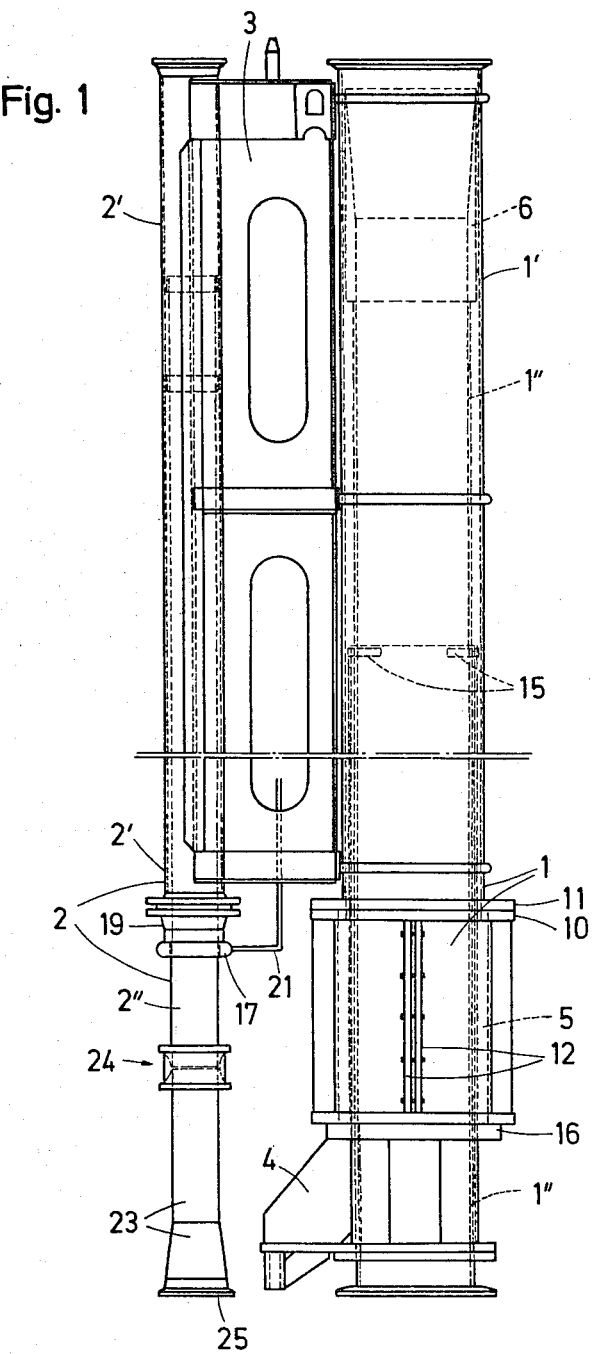
FIG. 1 is an elevational view of the lower-section of a bulk material conveyor for pneumatic dredgers, according to the invention

In FIG. 1, there is shown a bulk material conveyor of a pneumatic dredger, only the lower end region of the conveying line 1 and the compressed air line 2 being shown, with the aid of which a suction head or conveyor head (not shown) for sucking in the bulk material is passed along the bed of a body of water and which can be lowered or lifted during the conveying process depending on the varying depth of the water.

The lower end region of the conveying line 1 is herein formed by an upper and outer tube section 1' and by a lower and inner tube section 1". The inner tube section is longitudinally slidably guided in the outer tube section 1', the two tube sections 1' and 1" forming together a telescoping longitudinally adjustable lower end region of the conveying line 1.

The compressed air line 2 also comprises an upper and outer tube section 2' and a lower and inner tube section 2", wherein the outer tube section 2' is rigidly connected with the outer tube section 1' of the conveying line 1 via a longitudinally extending frame 3. The inner tube section 2" is longitudinally slidable in the outer tube section 2', such that the; lower end region of the compressed air line 2 can be lengthened and shortened telescopically.

The axial lengthening and shortering motion of the inner tube section 1" of the conveying line 1 as well as the inner tube section 2" of the compressed air line 2 is usually effected by way of a rope wound and unwound via a hoist (not shown), that for example engages the arm 4 of the lower tube section 1" and which can be guided upwards through the longitudinal frame 3.

Figure 2:
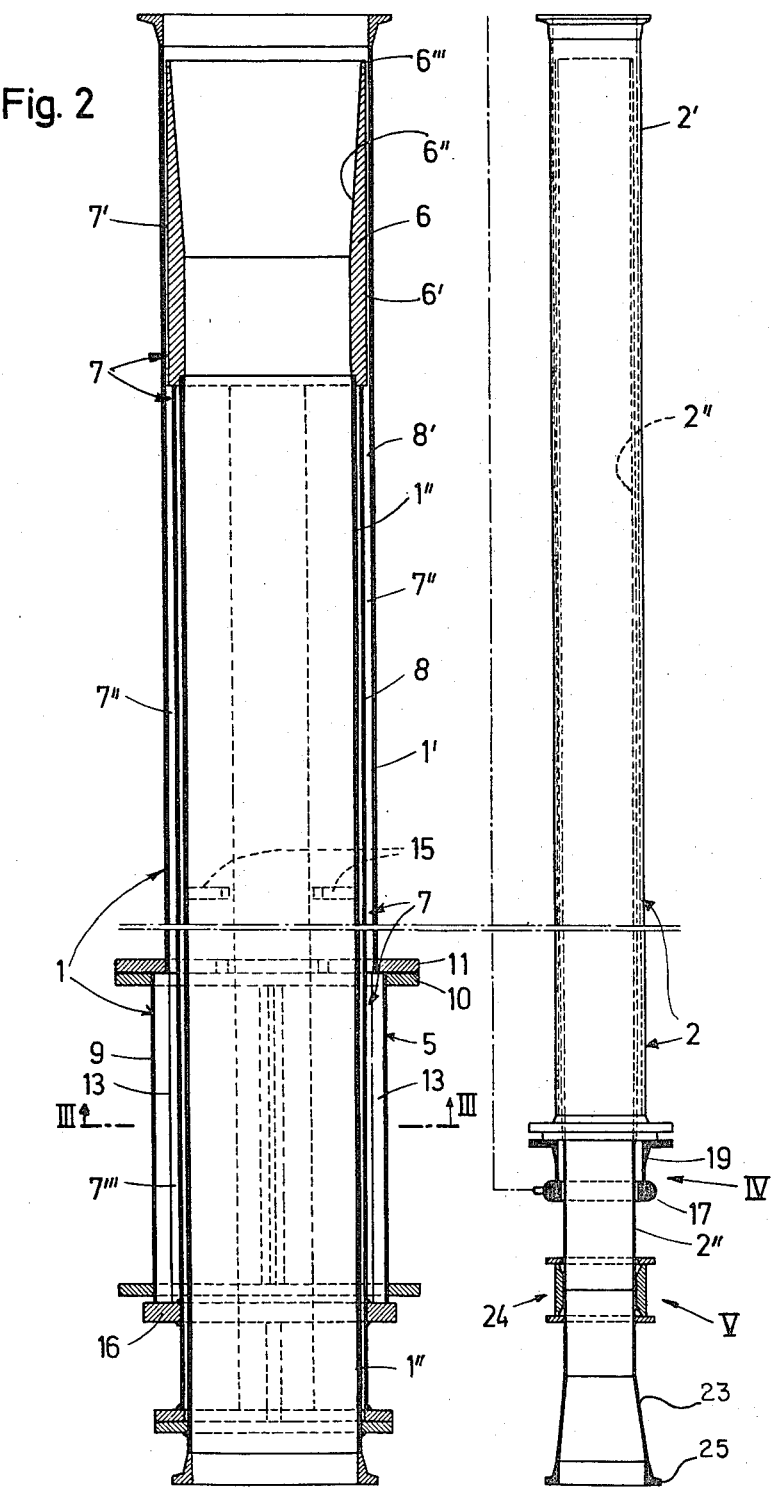
FIG. 2 is a simplified longitudinal section through the conveying line of the bulk conveyor; and the compressed air line.

The two telescoping tube section 1' and 1" of the conveying line 1 are shown, with particuliarity in FIG. 2, to be provided with guide members 5 and 6. Herein, the guide member 5 is located at the lower end of the inner tube section 1".

An interspace 7 is formed by the overlapping longitudinal regions of the two telescoping tube sections 1' and 1" of the conveying line 1. The interspace 7 also continues along the upper guide member 6 and along the lower guide member 5. In the longitudinal region of the upper guide member 6 the interspace forms, together with the inner surface of the outer tube section 1', an annular slot 7', which for example has a width of 10 mm. In the longitudinal region situated below the upper guide member 6 and extending to the lower guide member 5 the interspace 7 does not have the shape of a circular slot, but is determined in fact by several adjacent circle segment sections 7", as can be seen especially in FIG. 3. The smallest width of these circle segment sections 7" rangest from about the width of the circular slot 7', to the largest width of these circle segment sections 7", which is at least twice the width of the annular clearance 7'.

The longitudinal regions of the interspace 7 defined cross-section as circle segment sections 7" are formed by the inner tube section 1" being surrounded by a polygon jacket 8, for example with an eight corner cross-section, which jacket is situated with its polygonal faces being tangential to the outer surface of the tube section 1" and the polygon corners of which maintain a certain distance from the inner surface of the outer tube section 1'. The upper end of the polygon jacket 8 is, similar to the upper end of the inner tube section 1", rigidly connected to the guide member 6, for example by a weld. Herein the upper guide member 6 is formed as a sleeve having a cylindrical outer surface 6', whereas the inner surface 6" is conically expanded toward its free end and coacts there as a scraping edge 6"' with the inner surface of the outer tube section 1'. The lower end of the upper guide member 6 closes the essentially triangular free spaces 8' formed between the outer surface of the inner tube section 1" and the inner surface of the polygonal jacket 8.

The lower guide member 5 on the outer tube section 1' comprises a sleeve piece 9, which is releasably connected via a circular flange 10 with a circular flange 11 at the lower end of the outer tube section 1'. The sleeve piece 9 is formed by several shell portions, preferably two half shells 9' and 9", which in turn are bolted to one another via flanges 12.

The inner diameter of the sleeve piece 9 is herein dimensioned larger than the diameter of the outer tube section 1', wherein it carries on its inner surface elongated slideways 13, extending longitudinally and equally spaced around the circumference of the sleeve 9. The slideways define secants relative to the circumference of the outer tube section 1' and are formed in each case by an elongated strip 14, the longitudinal edges of which are contactingly attached to the inner surface of the sleeve piece 9 or the support shells 9', 9", respectively, for example by welding.

Figure 3:
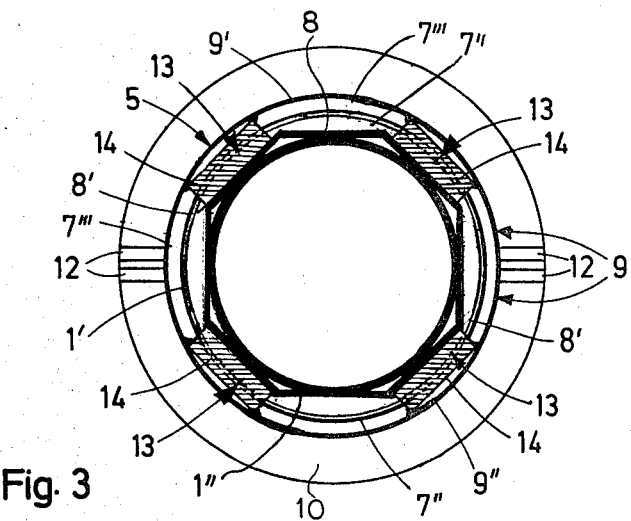
FIG. 3 is a cross-section taken along the line III—III of FIG. 2.

According to FIG. 3, the half shells 9', 9" are each provided with a pair of planar strips 14 or slideways 13, respectively. All slideways 13 or planar strips 14 are positioned in the sleeve piece 9 such that they protrude by a small amount into the circumference of the outer tube section 1', and in fact such that they coact in each case with a face of the polygonal jacket 8 surrounding the inner tube section, to form a longitudinal guide for the inner tube section 1".

The interspace 7 continues also inside of the sleeve piece 9 between the tube section 1' and the sleeve and is defined by and there annular segment sections 7'" formed between neighboring planar strips 14. The passage cross-section of the annular segment sections 7'" is larger than the passage cross-section of the annular segment sections 7". The planar strips 14 disposed in the sleeve piece 9 for the formation of the slideways 13 determine the number of the annular segment sections 7'", which are reduced by half relative to the number of the circle segment sections 7". However, since the annular segment sections 7'" have a larger cross-sectional dimension than the circle segment sections 7", they are able to direct the bulk material falling from about through the interspace 7 and to divert it without problem through the open bottom end of the sleeve piece 9.

On the outer surface of the polygonal jacket 8, at a distance below the upper guide member 6, there are provided detents 15, which can coact with the upper end faces of the planar strips 14 of the slideways 13 and thereby limit the sliding motion of the inner tube section 1". On the other hand, the inner tube section 1" near its lower end is provided with a flange 16 attached to the polygonal jacket 8, which coacts with the lower end of the sleeve piece 9, and thereby limits the upper end position for the inner tube section 1" as well as opening and closing the lower end of interspace 7.

The essential feature of the lower end region of the conveying line 1 formed by the two tube sections 1' and 1" is that the interspace 7 present between the overlapping portions of the telescoping tube sections 1' and 1" in several longitudinal portions have not only different forms of cross-section, but also from top to bottom, increasing cross-sectional dimensions. Thereby on the one hand, only bulk material up to a certain grain size can enter from about into the interspace 7. On the other hand, the entered bulk material encounters from top to bottom a continuously increasing space such that it can pass downwardly without any problem and can exit the interspace 7 without causing jamming between the two telescoping tube sections 1' and 1".

For uninterrupted operation of the bulk material conveying apparatus, that is for safe maintaining of the conveying column even during the lifting and lowering of the suction/head or conveyor head, an important aspect of the invention is to provide a sturdy structure for the compressed air line 2. As mentioned already, the lower end region of the compressed air line 2 comprises an outer tube piece 2' running parallel to the outer tube section 1', wherein the inner tube piece 2", coordinated with the inner tube section 1" and part of the compressed air line, is telescopically guided in the outer tube 2'.

Between the two tube pieces 2' and 2" of the compressed air line 2, and in fact at the lower end of the outer tube piece 2', there is located a sealing arrangement 17 of a special kind, constructed in such fashion and having such effect that it solidly brakes the two tube pieces 2' and 2" relative to each other in a rest position, however releasing them during each telescoping longitudinal change from each other, so that the shifting motion can be performed within the compressed air line 2 without pressure loss.

Figure 4:
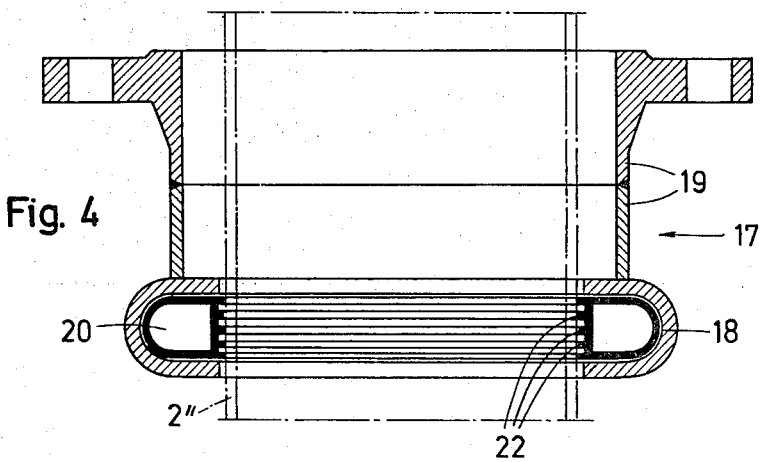
FIG. 4 is a longitudinal sectional view of region IV of FIG. 2, drawn to an enlarged scale.
Figure 5:
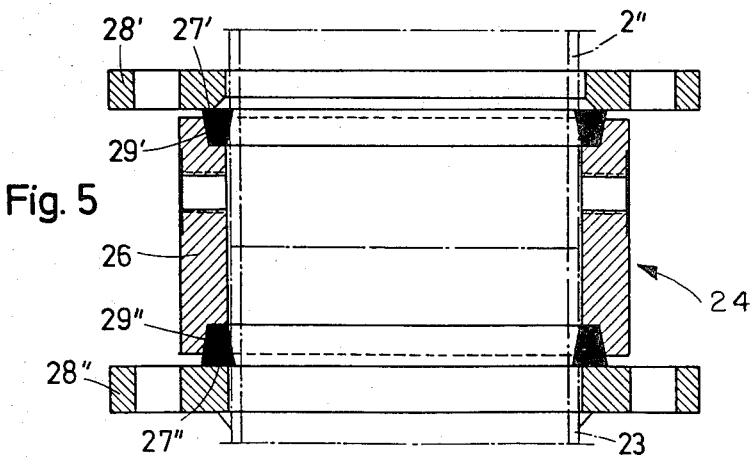
FIG. 5 is a longitudinal sectional view of the region V of FIG. 2.

The sealing arrangement 17 therein comprises, as is clearly shown in FIG. 4, an inflatable annular hose seal 20 supported in an annular shell 18 of a sleeve 19, which seal is connected with a compressed air line, which in turn is provided for and controlled by, from above the water level, for example from the operation facilities of the pneumatic dredger. The sleeve 19 is flanged and removably mounted on the lower end of the outer tube piece 2' and surrounds coaxially the inner tube piece 2". The annular hose seal 20, capable of being inflated by compressed air, is provided at its inner circumference with sealing lamellas or ribs 22, with which the hose can be pressed with large force effect against the outer surface of the inner tube piece 2" as soon as compressed air is fed to the seal 20. However, when the annular hose seal 20 is depressurized, it slackens so, that its sealing lamellas contact the outer surface of the inner tube piece 2" only with their own elastic tension. In this case, an axial shifting of the tube piece 2" is possible, without a substantial pressure drop in the compressed air line 2.

The sealing arrangement 17, and in particular the annular hose seal 20 is a relatively high-wearing construction part, which requires often maintenance checks and has therefore to be capable of an exchange without problem if required. For simplifying the maintenaince and exchange work for the sealing arrangement 17, the inner tube piece 2" of the compressed air line 2 has its end section, which continuously remains outside the outer tube piece 2', provided with a coupling sleeve 23 for the suction head or conveyor, respectively, and is connected via a separable coupling 24 to the tube piece 2", sleeve 23 also being connectable via a flange 25 to the suction or conveyor head, respectively.

The connecting coupling 24 comprises a clamping collar 26 surrounding the adjacent ends of the tube piece 2" and the coupling sleeve 23, two sealing rings 27', 27", each positioned on either side of the end surfaces as well as two annular flanges 28' and 28".

The clamping ring 26 has at its two ends annular grooves 29', 29" formed on the inner surface thereof, with a trapezoidal cross-section into which can be fitted the respective sealing rings 27', 27" in such way, that they protrude axially as well as radially inwardly from the annular grooves 29 and 29", respectively.

While the annular flange 28" is solidly connected, for example by welding, with the coupling sleeve 23 at a distance from the upper end of the coupling sleeve 23, the clamping collar 26 with the sealing rings 27' and 27" surrounds the two abutting ends of the tube piece 2" and the coupling sleeve 23 and allows axial motion thereof. Also, the annular flange 28' is axially movable and is coordinated to the tube piece 2".

The annular flanges 28' and 28" can be axially bolted together and thereby against the sealing rings 27' and 27" driving them radially inwardly as well as against the clamping collar 26, the bolts (not shown) being introduced through the annular flanges.

By way of the resulting elastic deformation, the sealing rings 27' and 27" are tensioned radially inwardly against the outer surface of the tube piece 2" and the coupling sleeve 23.

There results a pressure sealed connection between the tube piece 2" and the coupling sleeve 23. However, a sufficiently strong connection against undesired axial shifts between the tube piece 2" and the coupling sleeve 23 is achieved for assuring that upon an axial shift of the telescoping tube section 1" of the conveying line, a necessarily corresponding axial shift of the tube piece 2" of the compressed air line 2 occurs.

If it is necessary to axially withdraw the sealing arrangement 17 for maintenance purposes or for exchange, after demounting the sleeve 19 from the tube piece 2' via the tube piece 2", it is only necessary to loosen the connecting sleeve 24 by removal of the tensioning bolts. Then only the clamping collar 26 with the seal rings 27' and 27" as well as the annular flange 28' have to be shifted upwardly over the butt-joint between the coupling sleeve 23 and the tube piece 2". After loosening the connecting flange 25 between the coupling sleeve 23 and the suction or conveyor head, the coupling sleeve 23 can be removed from the tube piece 2". Now it is possible to withdraw and exchange the sealing arrangement 17 via the end of the tube piece 2".

The embodiment shown in the drawing and described above for the lower end section of a bulk material conveying apparatus for pneumatic dredgers is designed for a rigorous mode of operation not susceptible to trouble, with relatively little operational expense.

We claim:

1. In a pneumatic dredger bulk conveyor of the type wherein a conveyor line is formed by a first circular outer tube and a first inner tube telescopically slidable therein and a pressure line is formed by a second outer tube fixed to said first outer tube and a second inner tube telescopically slidable in said second outer tube in coordinated movement with said first inner tube, the improvement which comprises an upper circular guide member formed at the upper end of said first inner tube and closely spaced from said first outer tube defining a first circular interspace therewith, said first inner tube having below said upper guide member a polygonal profile forming a second interspace with said first outer tube having a greater cross sectional area than said first interspace and constituted by a plurality of first segmented passages of greater width than said first interspace and each of which is bounded by an arc of said first outer tube and a plane of said polygonal profile.

2. The improvement defined in claim 1 wherein said polygonal profile is an octagon.

3. The improvement defined in claim 2, further comprising a second guide member provided at the lower end of said first outer tube, said second guide member having a circular shell of greater diameter than said first outer tube, and at least two elongated planar shoes fixed in said shell diametrically opposite from one another and slidably engaging opposite faces of said octagon, said shoes defining with said shell and said octagon a plurality of second segmented passages of greater width than said first passages and forming a third interspace of greater cross sectional area than said second interspace.

4. The improvement defined in claim 3, further comprising at least one detent formed on said first inner tube and coacting with an upper end of said shoes for limiting the downward travel of said first inner tube.

5. The improvement defined in claim 4 wherein said upper guide member has an upwardly diverging inner surface forming an edge at the upper end of said upper guide member, said edge coacting with the inner surface of said first outer tube for removing residue therefrom.

6. The improvement defined in claim 5, further comprising an inflatable hose seal provided on said second outer tube of said pressure line, said hose seal coacting with said second inner tube when inflated for preventing displacement thereof.

7. The improvement defined in claim 6 wherein said hose seal is formed with a plurality of ribs contacting said second inner tube, said ribs having an elasticity sufficient for maintaining an air seal between said second outer and inner tubes when said hose seal is depressurized for allowing displacement of said second inner tube.

* * * * *